US009191207B2

(12) United States Patent
Zhang et al.

(10) Patent No.: US 9,191,207 B2
(45) Date of Patent: Nov. 17, 2015

(54) ANTI-SPYING ENCRYPTED KEYBOARD

(75) Inventors: Junkun Zhang, Guangzhou (CN); Zhulong Lin, Guangzhou (CN); Jing He, Guangzhou (CN); Ying Han, Guangzhou (CN)

(73) Assignee: GRG Banking Equipment Co., Ltd., Guangzhou, Guangdong (CN)

( * ) Notice: Subject to any disclaimer, the term of this patent is extended or adjusted under 35 U.S.C. 154(b) by 345 days.

(21) Appl. No.: 13/810,397

(22) PCT Filed: Jul. 22, 2011

(86) PCT No.: PCT/CN2011/077473
§ 371 (c)(1), (2), (4) Date: Jan. 15, 2013

(87) PCT Pub. No.: WO2012/022214
PCT Pub. Date: Feb. 23, 2012

(65) Prior Publication Data

US 2013/0142327 A1 Jun. 6, 2013

(30) Foreign Application Priority Data

Aug. 20, 2010 (CN) .......................... 2010 1 0261960

(51) Int. Cl.
*H04L 17/02* (2006.01)
*H04L 9/28* (2006.01)
(Continued)

(52) U.S. Cl.
CPC ................ *H04L 9/28* (2013.01); *G07F 7/1033* (2013.01); *G07F 19/2055* (2013.01); *H01H 2239/056* (2013.01)

(58) Field of Classification Search
None
See application file for complete search history.

(56) References Cited

U.S. PATENT DOCUMENTS

2007/0295810 A1* 12/2007 Hopt et al. .................... 235/441
2008/0278353 A1* 11/2008 Smith et al. .................... 341/22
(Continued)

FOREIGN PATENT DOCUMENTS

CN 201142285 Y 10/2008
CN 201266378 Y 7/2009
(Continued)

OTHER PUBLICATIONS

International Search Report dated Oct. 19, 2011 from corresponding International Application No. PCT/CN2011/077473.
Supplementary European Search Report dated Oct. 20, 2014 from corresponding European Application No. 1181774.

*Primary Examiner* — Shin-Hon Chen
(74) *Attorney, Agent, or Firm* — Wolf, Greenfield & Sacks, P.C.

(57) ABSTRACT

Disclosed is an anti-spying encrypted keyboard, particularly an anti-spying encrypted keyboard having an anti-spying detection protective system in multiple aspects. The anti-spying encrypted keyboard comprises a key panel and a main control board. The main control board includes a control circuit with self-destruct function. The control circuit is fixedly sealed on the back of the main control board by an anti-spying protective mechanism. The anti-spying protection mechanism is electrically connected with the control circuit. The anti-spying protection mechanism comprises: an anti-spying cover (31) having a bottom surface (311) and a side wall (312) extending perpendicularly along the edge thereof, the side wall (312) together with the bottom surface (311) forming a first cavity (313); a rigid anti-spying circuit board (32) being placed inside the first cavity (313), and a second cavity (326) being formed by a bottom side and a side wall with the circular edge, the bottom side of the second cavity (326) is provided with at least one pair of connecting fingers (3252) for the anti-spying circuit (32); and a conductive adhesive (34) placed inside the second cavity (326) to make the connecting fingers (3252) on the rigid anti-spy circuit board (32) and the connecting fingers (3252) on the control circuit of the main control board connect electrically.

9 Claims, 3 Drawing Sheets

(51) Int. Cl.

| | |
|---|---|
| ***G07F 19/00*** | (2006.01) |
| ***G07F 7/10*** | (2006.01) |
| *H03K 17/94* | (2006.01) |
| *H03M 11/00* | (2006.01) |

(56) References Cited

U.S. PATENT DOCUMENTS

| | | | | |
|---|---|---|---|---|
| 2008/0291016 | A1 * | 11/2008 | Sharp | 340/540 |
| 2009/0184850 | A1 * | 7/2009 | Schulz et al. | 341/22 |

FOREIGN PATENT DOCUMENTS

| | | | |
|---|---|---|---|
| CN | 201294178 | Y | 8/2009 |
| CN | 201514613 | Y | 1/2010 |
| CN | 101697182 | A | 4/2010 |
| CN | 201489599 | U | 5/2010 |
| CN | 101937589 | A | 1/2011 |
| CN | 101944244 | A | 1/2011 |
| WO | WO 2010/030279 | A1 | 3/2010 |

* cited by examiner

ANTI-SPYING ENCRYPTED KEYBOARD

The present application claims the benefit of priority to Chinese patent application No. 201010261960.5 titled "ANTI-SPYING ENCRYPTED KEYBOARD", filed with the Chinese State Intellectual Property Office on Aug. 20, 2010. The entire disclosures thereof are incorporated herein by reference.

TECHNICAL FIELD OF THE INVENTION

The present invention relates to an encryption keyboard, in particular to an anti-poking encryption keyboard having a multi-directional anti-poking detection and protection system.

BACKGROUND OF THE INVENTION

The hard encryption keyboard of a bank self-service equipment bears works of inputting and encrypting a bank password of a user, and thus a working key and a master key of the bank are stored in a core processing part of the keyboard. For an unspeakable purpose, some criminals usually jimmy or poke the keyboard to steal the user password and even to decrypt the working key and master key of the bank in order to steal bank information, which threatens the security of information and money of the user and the bank directly.

The encryption keyboard is generally provided with a poking detection and protection structure and a poking detection and protection circuit. When the keyboard is subjected to a physical poking, the poking detection and protection circuit outputs a self-destruction signal to realize a self-destruction function of the encryption keyboard, so as to prevent the criminals from stealing bank information.

The Chinese patent application CN201489599U discloses an encryption keyboard and a poking detection and protection structure thereof. The disclosed encryption keyboard includes an anti-peeping cover, an anti-peeping cover bracket, a poking detection and protection net and conductive adhesive. The poking detection and protection net is received inside the anti-peeping cover, and is clamped and fixed between the anti-peeping cover and the anti-peeping cover bracket by the anti-peeping cover bracket, and is provided with a plurality of first gold fingers thereon. A main control board in the keyboard is provided with a poking protection circuit provided with a plurality of second gold fingers thereon. The first gold fingers and the second gold fingers are electrically connected via the conductive adhesive. The anti-peeping cover bracket is provided with a cavity at the position corresponding to the first gold fingers, and the conductive adhesive is filled in the cavity.

The above poking detection and protection net is a double-layer flexible circuit board, and the periphery edges thereof is folded such that the poking detection and protection net is formed into a cuboid shape and covers a main control circuit board required to be protected. Thus, there is no gap between the main control circuit board and the exterior, which achieves the anti-poking purpose. An anti-poking detection circuit is provided in the flexible circuit board and is covered with detection wirings by using the maze wiring method. The anti-poking detection circuit is directed onto a surface of the flexible circuit board by a gold finger, and is electrically connected with the control circuit of the main control board for realizing the self-destruction function via the gold finger. When the flexible circuit board is subjected to the physical poking, a self-destruction signal can be output by making short circuit between any two adjacent wirings or breaking any one wiring. Thus, the self-destruction function of the encryption keyboard is realized, and sensitive information is deleted immediately, so as to prevent the criminals from stealing bank information.

This technology has following disadvantages.

First, since the flexible circuit board can only be made with two layers, with an outer layer being ground layer without wiring and an inner layer being maze wiring layer, and the gold fingers at the connection between the flexible circuit board and the protected main control circuit board are relatively thick, the criminals can easily scrape the ground layer and connect the gold fingers at the two ends of the inner layer. In this way, the whole maze wiring layer fails to function by making short circuit between the wirings, and thus loses the protective effect.

Second, Because of the flexibility of the flexible circuit board, the criminals may only tightly press the connection wires between the flexible circuit board and the protected circuit board, and then turn over the other parts of the circuit board to expose the protected circuit and to thereby lose the protective effect.

Therefore, it is very important to provide an encryption keyboard having a multi-directional anti-poking detection and protection system.

SUMMARY OF THE INVENTION

The object of the present invention is to provide an anti-poking encryption keyboard with a multi-directional anti-poking detection and protection system in order to effectively prevent illegal operations of poking to obtain password information from the front surface and the side surfaces of a keyboard panel.

In order to realize the above object, the present invention provides the following technical solutions.

The anti-poking encryption keyboard includes a keystroke panel and a main control board. The main control board includes a control circuit for realizing a self-destruction function. The control circuit is fixedly enclosed at the rear of the main control board by an anti-poking protection mechanism. The anti-poking protection mechanism is connected electrically with the control circuit. The anti-poking protection mechanism includes:

an anti-peeping cover having a bottom surface and a side wall extending vertically along periphery edges of the bottom surface, a first cavity being formed by the side wall and the bottom surface;

a hard anti-poking circuit board in which an anti-poking circuit is provided, a second cavity including a bottom surface and a periphery annular side wall, at least one pair of leading gold fingers of the anti-poking circuit being provided on the bottom surface of the second cavity, the hard anti-poking circuit board being received inside the first cavity; and conductive adhesive disposed in the second cavity so as to form electrical connection between the leading gold fingers of the hard anti-poking circuit board and the leading gold fingers of the control circuit of the main control board.

Preferably, the hard anti-poking circuit board is a printed circuit board with at least two layers of anti-poking circuit.

Further, one side of the leading gold fingers away from the main control board is covered by at least one layer of anti-poking circuit.

Preferably, the hard anti-poking circuit board is of a four-layer printed circuit board structure in which an outermost layer is ground layer and the other three layers are printed circuit board layers with anti-poking circuit and are piled on the outermost layer. The three layers are all provided with maze wiring except intermediate layer through holes, and relatively wide wiring clearances of the maze wiring of the three layers of anti-poking circuit are complemented and covered by each other.

Preferably, the hard anti-poking circuit board is formed by assembling five printed circuit boards, among wherein four printed circuit boards are connected in an end-to-end manner to form an annular side wall. The annular side wall is electrically connected to a surface of the fifth printed circuit board, and a complete anti-poking circuit is formed by the five circuit boards.

Further, at least one of the four printed circuit boards of the annular side wall is electrically connected to the surface of the fifth printed circuit board.

Preferably, two adjacent boards of the five printed circuit boards are electrically connected at least by two soldering joints.

Preferably, a conductive adhesive locating bracket is provided between the hard anti-poking circuit board and the main control board, and through holes for containing the conductive adhesive are provided in the conductive adhesive locating bracket at positions corresponding to the gold fingers of the hard anti-poking circuit board and of the main control board.

Preferably, maze wiring is applied to the anti-poking circuit in the circuit board.

Compared with the prior art, the technical solutions of the present invention have following advantages.

First, the hard anti-poking circuit board is configured in the design of the hard circuit board having more than two layers. Leading gold fingers of the anti-poking circuit are provided on the innermost surface of the hard anti-poking circuit board, and the rear of relatively thick wirings in each layer of circuit is covered by wirings of other layers, which may effectively prevent the whole maze wiring from disabling due to short circuit caused from the rear of the anti-poking circuit by the criminals, and may prevent the ground layer from being scraped to connect the connecting fingers. Thus, the difficulty of illegal poking is greatly increased, and the security of the anti-poking protection mechanism is improved.

Further, since the anti-poking protection cover is formed by assembling with hard materials, the anti-poking protection cover can not be bended, and even if it is bended forcibly, its inner circuits will be break. Thus, it is possible to prevent the attack of turning over and to increase the security of the anti-poking protection mechanism.

DETAILED DESCRIPTION OF THE INVENTION

Hereinafter, the technical solutions in embodiments of the present invention will be described clearly and completely in conjunction with drawings in the embodiments of the present invention. Apparently, the described embodiments are only preferred embodiments of the present invention, not all of the embodiments. Based on the embodiments of the present invention, all of other embodiments made by the person skilled in the art without inventive effort are deemed to fall in the protection scope of the present invention.

Figure 1:
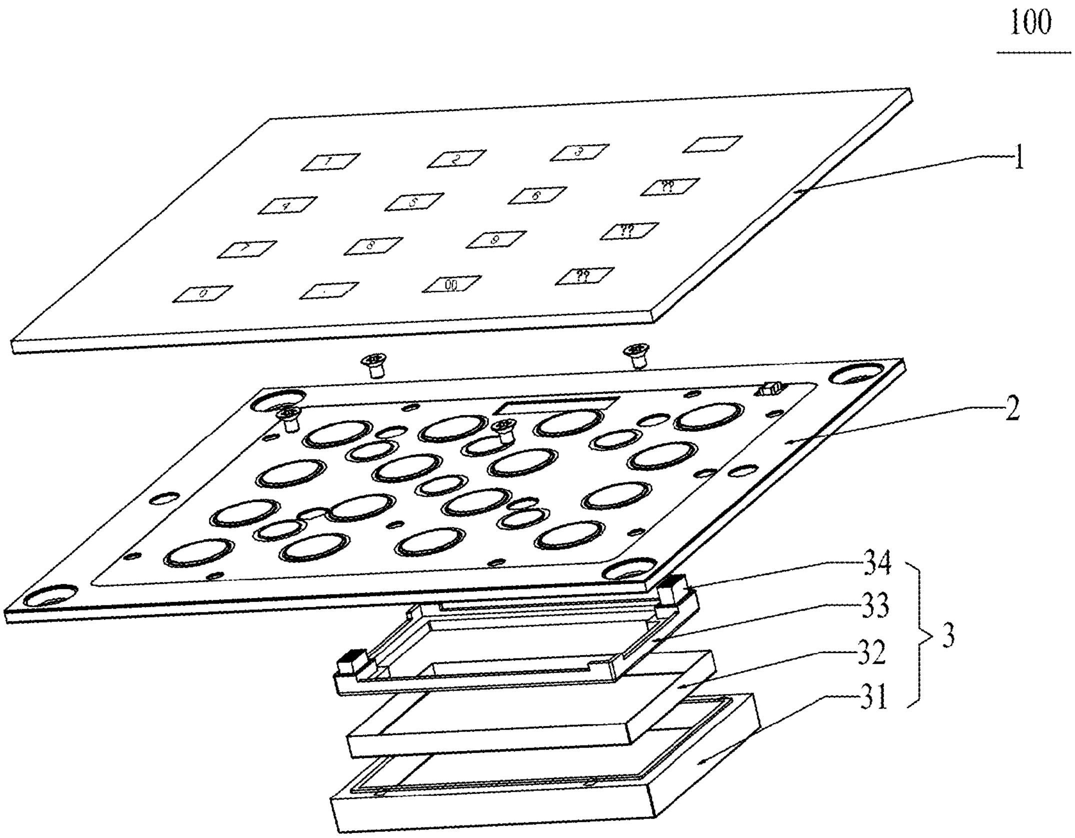
FIG. 1 is an exploded view of an anti-poking encryption keyboard according to the present invention.

Referring to FIG. 1, an exploded view of an anti-poking encryption keyboard according to the present invention is shown. The anti-poking encryption keyboard 100 includes a keystroke panel 1 and a main control board 2 having a control circuit for realizing a self-destruction function. An anti-poking protection mechanism 3 is fixed to the rear of the main control board 2 and is electrically connected to the control circuit. The anti-poking protection mechanism 3 includes an anti-peeping cover 31, a hard anti-poking circuit board 32 and conductive adhesive 34.

The anti-peeping cover 31 has a bottom surface and a side wall extending vertically along the peripheral edges of the bottom surface, and a first cavity is formed by the side wall and the bottom surface. An anti-poking circuit is provided inside the hard anti-poking circuit board 32. A second cavity includes a bottom surface and a peripheral annular side wall. At least one pair of leading gold fingers of the anti-poking circuit are provided at the bottom surface of the second cavity. The hard anti-poking circuit board is inserted in the first cavity. The conductive adhesive 34 is disposed in the second cavity to form electrical connection between the leading gold fingers of the hard anti-poking circuit board and the leading gold fingers of the control circuit of the main control board.

Further, the anti-poking encryption keyboard may also includes a conductive adhesive locating bracket 33 disposed between the hard anti-poking circuit board and the main control board. Through holes for containing the conductive adhesive are formed in the conductive adhesive locating bracket at positions corresponding to the gold fingers on the hard anti-poking circuit board and the main control board.

Figure 2:
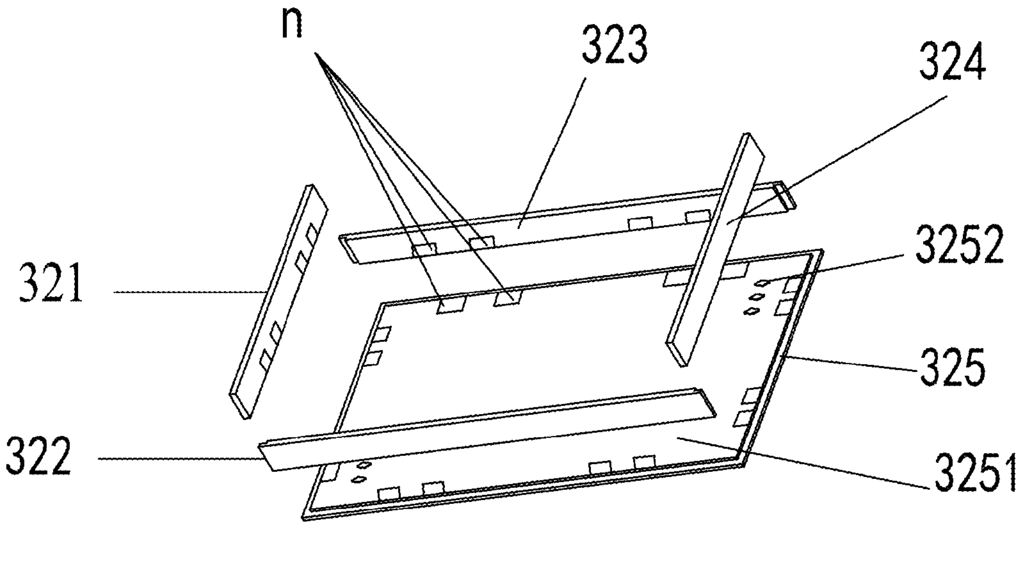
FIG. 2 is a structural exploded view of a hard anti-poking circuit board according to the present invention.

Referring to FIG. 2, a structural exploded view of the hard anti-poking circuit board according to the present invention is shown. The hard anti-poking circuit board 32 includes five printed circuit boards (PCB board) 321, 322, 323, 324 and 325. The PCB boards 321, 322, 323 and 324 are connected in an end-to-end manner to form an annular side wall. The annular side wall is electrically connected to a surface 3251 of the fifth printed circuit board 325. Gold fingers 3252 are provided on the surface 3251. Two circuit lead pins are provided on each of the PCB boards 321, 322, 323 and 324, respectively. At each circuit lead pin each PCB board is electrically connected to a circuit lead pin on the PCB board 325 via two soldering joints n, so that the five circuit boards form a complete anti-poking circuit. Based on the wiring property of the anti-poking circuit, the hard anti-poking circuit board is formed by assembling the five circuit boards, wherein four printed circuit boards may be configured into the annular side wall which is electrically connected in the end-to-end manner, and the annular side wall is electrically connected to the circuit lead pins on the surface of the fifth PCB board via at least two soldering joints, so that a complete anti-poking circuit is formed by the five circuit boards. Of course, depending on designs, there are still many forms in the circuit connection mode of the five PCB boards, as long as the anti-poking circuits of the PCB boards can form an integral circuit.

The hard anti-poking circuit board 32 is formed by assembling with hard materials and can not be bended. Even if the hard anti-poking circuit board 32 is bended forcibly, its inner circuits will be break. Thus, it is possible to prevent the attack of turning over and to increase the security of the anti-poking protection cover.

Figure 3:
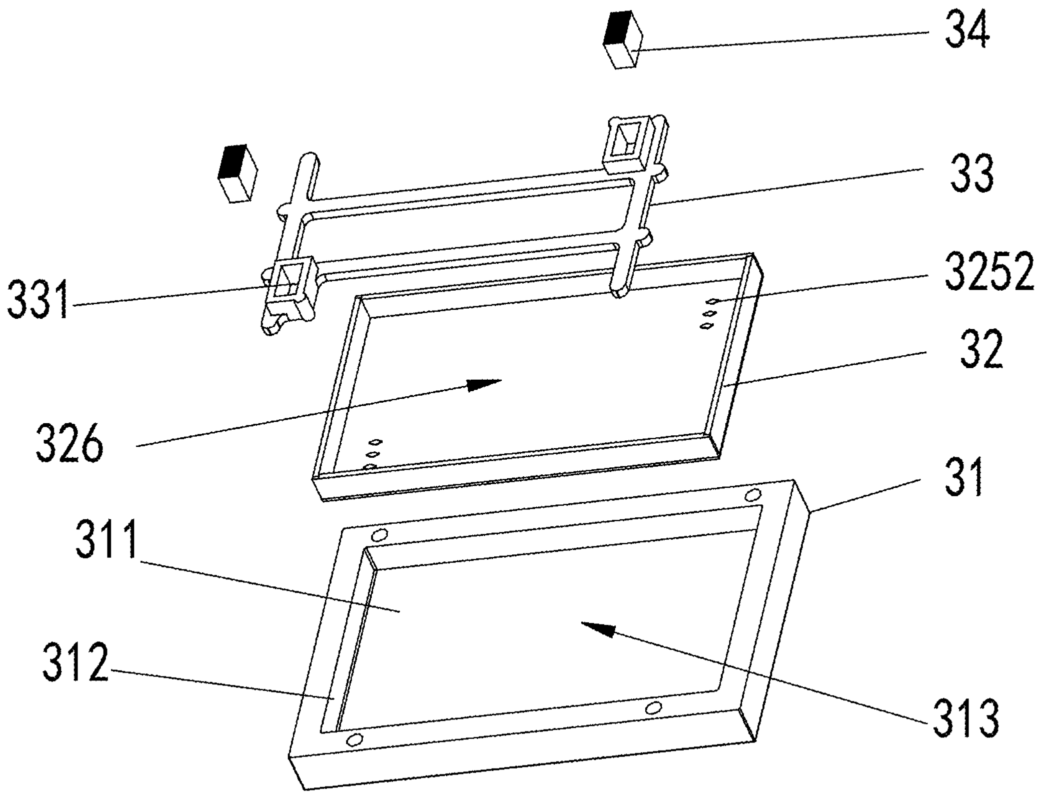
FIG. 3 is a structural exploded view in an anti-poking mechanism of an anti-poking encryption keyboard according to the present invention.

Referring to FIG. 3, a structural exploded view of the anti-poking mechanism in the anti-poking encryption keyboard according to the present invention is shown. The anti-poking protection mechanism 3 includes the anti-peeping cover 31. The anti-peeping cover 31 has a bottom surface 311 and a side wall 312 extending vertically along the periphery edges of the bottom surface. A first cavity 313 is formed by the side wall 312 and the bottom surface 311. The hard anti-poking circuit board 32 is received inside the first cavity 313. A second cavity 326 is formed by a bottom surface of the PCB board 325 and an annular side wall formed by connecting other four PCB boards (321, 322, 323 and 324) in the end-to-end manner. A pair of leading gold fingers 3252 of the anti-poking circuit are provided on the bottom surface of the second cavity 326, i.e. the inner surface 3251 of the PCB board 325. The leading gold fingers 3252 of the anti-poking circuit on the hard anti-poking circuit board 32 are electrically connected to the leading gold fingers (not shown) of the control circuit of the main control board 2 via the conductive adhesive 34. In order to ensure the precise and reliable abutment between the conductive adhesive 34 and the leading gold fingers of the hard anti-poking circuit board 32 and of the main control board, the conductive adhesive locating bracket 33 is provided between the hard anti-poking circuit board 32 and the main control board 2, and through holes 331 for containing the conductive adhesive is formed in the conductive adhesive locating bracket 33 at positions corresponding to the gold fingers of the hard anti-poking circuit board 32 and of the main control board 2.

The design of the conductive adhesive bracket ensures that the conductive adhesive can not be moved or bended between the hard anti-poking circuit board 32 and the main control board 2, and ensures that the conducting state of circuits between the hard anti-poking circuit board 32 and the main control board 2 is free from influence. According to the design feature of the anti-poking circuit of the hard anti-poking circuit board 32, the conductive adhesive bracket 33 in this embodiment is of "井" or "□" shape, and the through holes 331 for containing the conductive adhesive 34 are provided at the outer side of an diagonal intersection of the conductive adhesive bracket 33 where corresponds to the gold fingers 3252 of the hard circuit board 32.

Figure 4:
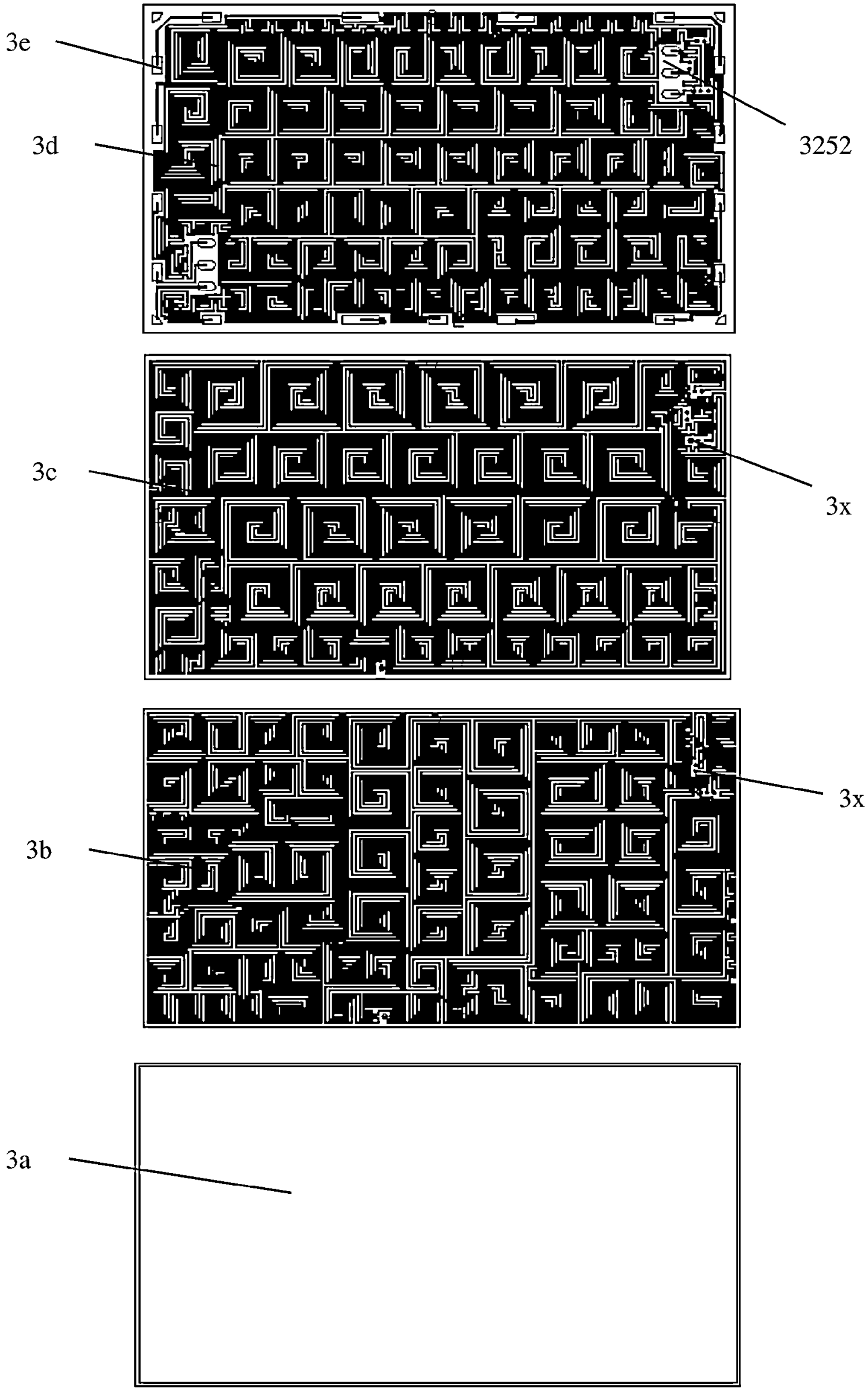
FIG. 4 is a schematic view of the layout of circuits in various layers of the structure of a four-layer hard anti-poking circuit board according to the present invention.

Referring to FIG. 4, a schematic view of the layout of circuits in various layers of the structure of a four-layer hard anti-poking circuit board according to the present invention is shown. The hard anti-poking circuit board 32 is in a design of a four-layer PCB board in which an outermost layer is ground layer 3*a* and intermediate layers 3*b* and 3*c* are all provided with maze wiring except intermediate layer through holes 3*x*. The intermediate layer through holes 3*x* are located by the side of the gold fingers 3252. A plurality of transmission signal welding joints 3*e* are provided on the innermost layer 3*d*. The rear of the gold fingers 3252 connected to the main control circuit board is covered by the wirings of the intermediate layer(s) 3*b* and/or 3*c*. Transmission signal welding joints corresponding to the transmission signal welding joints 3*e* are provided on the surfaces of the other four circuit boards which form the cavity-shaped hard anti-poking circuit board 32. In assembling, corresponding transmission signal welding joints are electrically connected by soldering tin so as to form a complete anti-poking circuit.

In the design of the hard circuit board having more than two layers, the rear of relatively thick wires of the gold fingers 3252 of the innermost layer 3*d* are covered by the wirings of the intermediate layer(s) 3*b* and/or 3*c*, which may effectively prevent the whole maze wirings from disabling due to short circuit caused from the rear of the anti-poking circuit by the criminals, and may also prevent the ground layer 3*a* from being scraped to connect the connecting fingers 3252. Thus, the difficulty of illegal poking is greatly increased, and the security of the anti-poking protection mechanism 3 is improved.

Based on the above description, many modifications and improvements may be made by the person skilled in the art without departing from the principle of the present invention, and these modifications and improvements should be deemed to fall into the protection scope of the present invention.

What is claimed is:

1. An anti-poking encryption keyboard, comprising a keystroke panel and a main control board, wherein the main control board comprises a control circuit for realizing a self-destruction function, the control circuit is fixedly enclosed at the rear of the main control board by an anti-poking protection mechanism, the anti-poking protection mechanism is electrically connected with the control circuit, characterized in that, the anti-poking protection mechanism comprises:

an anti-peeping cover having a bottom surface and a side wall extending vertically along periphery edges of the bottom surface, a first cavity being formed by the side wall and the bottom surface;

a hard anti-poking circuit board in which an anti-poking circuit is provided, a second cavity comprising a bottom surface and a periphery annular side wall, at least one pair of leading gold fingers of the anti-poking circuit being provided on the bottom surface of the second cavity, the hard anti-poking circuit board being received inside the first cavity; and conductive adhesive provided in the second cavity so as to form electrical connection between the leading gold fingers of the hard anti-poking circuit board and the leading gold fingers of the control circuit of the main control board.

2. The anti-poking encryption keyboard according to claim 1, wherein the hard anti-poking circuit board is a printed circuit board with at least two layers of anti-poking circuit.

3. The anti-poking encryption keyboard according to claim 2, wherein, one side of the leading gold fingers away from the main control board is covered by at least one layer of anti-poking circuit.

4. The anti-poking encryption keyboard according to claim 1, wherein the hard anti-poking circuit board is of a four-layer printed circuit board structure in which an outermost layer is ground layer and the other three layers are printed circuit board layers with anti-poking circuit and are piled on the outermost layer, the three layers are all provided with maze wiring except intermediate layer through holes, and relatively wide wiring clearances of the maze wiring of the three layers of anti-poking circuit are complemented and covered by each other.

5. The anti-poking encryption keyboard according to claim 1, wherein the hard anti-poking circuit board is formed by assembling five printed circuit boards, among which four printed circuit boards are connected in an end-to-end manner to form an annular side wail, the annular side wall is electrically connected to a surface of the fifth printed circuit board, and a complete anti-poking circuit is formed by the five circuit boards.

6. The anti-poking encryption keyboard according to claim 5, wherein at least one of the four printed circuit boards of the annular side wall is electrically connected to the surface of the fifth printed circuit board.

7. The anti-poking encryption keyboard according to claim 5, wherein two adjacent boards of the five printed circuit boards are electrically connected at least by two soldering joints.

8. The anti-poking encryption keyboard according to claim 1, wherein a conductive adhesive locating bracket is provided between the hard anti-poking circuit board and the main control board, and through holes for containing the conductive adhesive are provided in the conductive adhesive locating bracket at positions corresponding to the gold fingers of the hard anti-poking circuit board and of the main control board.

9. The anti-poking encryption keyboard according to claim 1, wherein maze wiring is applied to the anti-poking circuit in the circuit board.

* * * * *